United States Patent [19]
Humphrey et al.

[11] Patent Number: 5,824,738
[45] Date of Patent: Oct. 20, 1998

[54] LIGHT STABLE ALIPHATIC THERMOPLASTIC URETHANE ELASTOMERS AND METHOD OF MAKING SAME

[75] Inventors: William M. Humphrey, Dover; Victor E. Gerard, Rochester, both of N.H.

[73] Assignee: Davidson Textron Inc., Dover, N.H.

[21] Appl. No.: 319,614

[22] Filed: Oct. 7, 1994

[51] Int. Cl.$^6$ ..................................................... C08L 75/04
[52] U.S. Cl. ........................... 524/715; 524/91; 524/589; 524/839; 528/61
[58] Field of Search .............................. 528/61; 524/589, 524/91, 715, 839

[56] References Cited

U.S. PATENT DOCUMENTS

| | | | |
|---|---|---|---|
| 4,721,531 | 1/1988 | Wildeman et al. | 106/309 |
| 5,096,993 | 3/1992 | Smith et al. | 528/61 |
| 5,185,420 | 2/1993 | Smith et al. | 528/61 |

*Primary Examiner*—Patricia A. Short
*Attorney, Agent, or Firm*—Reising, Ethington, Learman & McCulloch PLLC

[57] ABSTRACT

An improved light stable polyether/polyol based aliphatic urethane thermoplastic elastomer prepared from reacting inter alia a polyol having low terminal end unsaturation and an organic diisocyanate. The elastomer is characterized by ultraviolet stabilizer being present in a range of 0.25% to 2.0% at a total concentration of 1.0% to 2.0%, an antioxidant being present at a total concentration of 0.10% to 1.0%, and colorants/pigment being present in a total concentration in a range from 1.0% to 2.05% to produce an elastomer capable of withstanding Xenon arc artificial weathering with $DE \leq 3.00$ after 2450 kilojoules of exposure.

26 Claims, No Drawings

1

LIGHT STABLE ALIPHATIC THERMOPLASTIC URETHANE ELASTOMERS AND METHOD OF MAKING SAME

TECHNICAL FIELD OF THE INVENTION

The present invention relates generally to the production of thermoplastic polyurethane elastomers and, more specifically, to the production of an improved light stable polyether/polyol aliphatic urethane elastomer.

BACKGROUND OF THE INVENTION

The use of low unsaturation level polyols made from double metal cyanide catalysts in combination with chain extenders in the preparation of thermoplastic elastomers is disclosed in U.S. Pat. Nos. 5,096,993 and 5,185,420 both to Smith et al., incorporated herein by reference. Prior to the use of double metal cyanide catalysts for the preparation of high molecular weight polyols, the thermoplastic polyurethane elastomers produced had poor physical properties such as being too hard due to high levels of terminal unsaturation in the polyols used in their production.

The thermoplastic polyurethane elastomers of the '993 and '420 patents to Smith et al. describe the preparation of thermoplastic elastomers made with polyols have less than 0.04 meq/g of end group unsaturation, particularly, thermoplastic elastomers characterized by enhanced softness.

Because of their softness, thermoplastic elastomers are frequently used in the construction of automotive interior trim components. Automotive manufacturers frequently specify that the elastomers used to produce interior trim components have adequate long-term stability and resistance to degradation by ultraviolet light and that the elastomers must also meet specific manufacturing specifications for resistance to ultraviolet light exposure.

Commonly, in order to achieve the manufacturing specifications for resistance to ultraviolet exposure, antioxidants, ultraviolet light stabilizing agent(s), and pigment(s) are added to elastomers.

However, to date, soft thermoplastic polyurethane elastomers have not been produced which are able to meet or exceed manufacturers requirements for withstanding prolonged levels of artificial weathering which simulates exposure to the heat and ultraviolet radiation and sunlight. Additionally, due to the previous presence of end group unsaturation of polyols with molecular weights greater than 2,000, soft (low durometer) aliphatic thermoplastic urethane elastomers were not available in a dry castable powder or particle forms.

SUMMARY OF THE INVENTION AND ADVANTAGES

The present invention provides a light stable polyether/polyol based aliphatic thermoplastic urethane elastomer and is comprised of the reaction product of a polyol, chain extender, organic diisocyanate, ultraviolet stabilizing agent, an antioxidant, pigment, and a urethane catalyst.

More particularly, the present invention provides a light stable polyether/polyol based aliphatic urethane thermoplastic elastomer wherein the ultraviolet stabilizing agents include hindered amine light stabilizers (HALS) and a hydroxyphenyl benzotriazole are present in a ratio in a range of 1:1 to 2:1 at a total concentration in a range of 0.1% to 2.0%, the antioxidant being present at a total concentration in a range of 0.1% to 1.0% and the pigment being present at a total concentration in a range 1.0% to 2.0%, whereby the elastomer produced thereby can withstand Xenon arc artificial weathering with a DE$\leq$3.00 after 2450 kilojoules of exposure.

The present invention also provides a method for preparing light stable automotive components from a polyether/polyol based aliphatic urethane thermoplastic elastomer, and a method for preparing the subject thermoplastic elastomer into a castable powder.

DETAILED DESCRIPTION IN THE INVENTION

The present invention provides an improved light stable polyether/polyol based aliphatic urethane thermoplastic elastomer in that it can withstand Xenon arc artificial weathering with a DE$\leq$3.00 after 2450 kilojoules of exposure. Furthermore, the light stable elastomer of the present invention is prepared using critical ratios of ultraviolet stabilizing agent, antioxidant, and pigment. This advance in the art comes at a time which is particularly timely given the current trend towards the increased use of thermoplastic elastomers for automotive interior trim components and at a time where automotive manufacturers are demanding components which can last longer and remain light and heat stable over time.

Certain aspects of the present invention are conventional, employing reactants known in the art as will be seen from the disclosure set forth below. The unique and critical combination of ultraviolet stabilizing agents, antioxidant and pigment employed in the present invention results in an improved light stable urethane thermoplastic elastomer.

The prior art, in particular, as represented by U.S. Pat. Nos. 5,096,993 and 5,185,420 to Smith et al. teach how to achieve a soft, thermally stable elastomer utilizing low unsaturation level polyols prepared by double metal cyanide complex catalysis. These references teach the use of certain compounding ingredients such as antioxidants, plasticizers, ultraviolet stabilizers, adhesion promoters, fillers, and pigments employed in an amount between zero and about 75% based upon the total weight of the composition. These references are silent as to any criticality involving the ratios of ultraviolet stabilizing agents, antioxidants, and pigment and the effect these critical ratios and amounts have on the ability of the elastomers to withstand artificial weathering, i.e., Xenon arc exposure.

The present invention uses conventional urethane chemistry along with critical amounts of ultraviolet stabilizer(s), antioxidant(s), and pigment(s) to give the desired light stability and weathering properties demanded by automobile manufacturers.

The thermoplastic elastomers of the present invention may be made by a "one-shot" reaction process. The "one-shot" technique involves mixing, in a suitable container, polyol, chain extender, organic diisocyanate, ultraviolet stabilizing agent(s), antioxidant, pigment(s), and urethane catalyst and, then, agitating the mixture for approximately 20 to 30 seconds. These elastomers can also be made by preblending a portion of the polyol, the antioxidant, catalyst and UV/heat stabilizers. The blend is added to an agitated, heated tank of a urethane casting machine; isocyanate is placed into a separate agitated, heated tank; chain extender/crosslinker is placed into a third tank; and pigment masterbatch with the additional polyol is added at the mixhead. The components are metered individually using gear pumps or other pumps with the required metering accuracy, with suitable flow control devices, to a low pressure mixhead for blending. This mixture may be cast onto a temperature and speed controlled belt for completion of the reaction. Various temperatures could be maintained in different areas of the chamber.

The mixture from the mixing head of the urethane casting machine could also be used as the feed for a twin screw extruder. Various screw sections could be set up to convey the liquid to continue polymerization, melt and blend the elastomer, and the final unpigmented elastomer could be fed to a strand die for pelletizing. The extruder output could also be used to make beads of the desired size for dry casting.

The extrusion operation could also be used to melt blend dry pigment for coloring/pigmenting the elastomer. The dry blended pigment would be fed into the extruder using a side feeder which would meter the proper amount into a clear melt mixture. The output of the side feeder would be synchronized with the output of the extruder.

Finally, loss in weight belt feeders could be used to replace the metering machine and the ingredients would be fed directly into the throat of the twin screw extruder which would perform the blending, polymerization, melting, and pigmentation operations.

In preparing the improved light stable polyether/polyol based aliphatic urethane thermoplastic elastomer of the present invention, the polyether/polyol, diisocyanate, chain extender, and other components are typically reacted under conditions of elevated temperature. A preferred method of forming the desired thermoplastic elastomers is by continuous processing utilizing an extruder. An alternative method involves mixing in a "one shot" batch process, the polyol, chain extender, organic diisocyanate, ultra violet stabilizing agent, antioxidant, pigment, and urethane catalyst in a vessel to produce the elastomer of the present invention. The "one shot" reaction is then placed into a suitable container, heated to complete the reaction of the components and allow polymerization of the "one shot" mixture and, then, the elastomer is chopped or ground into a powder using either a non-cryogenic or a cryogenic methods such as liquid nitrogen to facilitate and expedite the granularization or pelletizing of the elastomer.

A method for producing a powder or particle is described in office file P-661, U.S. Ser. No. 267,252, hereby incorporated by reference. The elastomer powder or beads are then suitable for use as a castable powder. That is, the powder can be placed in a molding tool and heated to form an article of manufacture. Non-cryogenic grinding is made possible by changing the index of the elastomer. The index is the ratio of reactive equivalents of NCO containing components/ reactive equivalents of OH and NH containing components. This change reduces the molecular weight of the elastomer and its inherent toughness allowing the polymer to be ground at ambient temperatures. The polymer may be prepared with an index from 90 to 99 with a preferred range of 94 to 98.

The mixing of the reactants can be carried out at ambient temperature (on the order of 25° C.) and the resulting mixture is then heated to a temperature of the order of about 40° C. to about 130° C., preferably to a temperature of about 90° C. to 120° C.

Preferred polyol reactants are the polyether polyols and combinations thereof. Preferably the polyol is of the type manufactured using an organometallic catalyst which results in a polyol having a level of terminal unsaturation of less than 0.04 meq/g, and preferably less than 0.02 meq/g. A representative example of such a polyol is Poly L 255-28 (sold by Olin corporation, Stamford, Connecticut). Poly L 255-28 is a ethylene oxide capped poly (propylene oxide) polyol with an approximate molecular weight of 4000 and a hydroxyl number of 28. The polyol component can be present in amounts ranging from approximately 40% to 70%. The preferred concentration of polyol present in the reaction ranges between 40% and 60% and is adjusted in this range to vary the hardness of the elastomer produced.

Chain extending agents which may be employed in the preparation of the urethane thermoplastic elastomer of the present invention include aromatic secondary or aliphatic primary or secondary diamines, all of which are well known in the art.

Chain extenders such as ethylene glycol, diethylene glycol, propylene glycol, pentane diol, 3-methylpentane-1, 5-diol, hexane diol, HQEE [hydroquinone bis(2-hydroxyethyl) ether], CHDM (1,4-cyclohexanedimethanol), or HBPA (hydrogenated bisphenol A) could also be used.

In the preferred embodiment, the chain extender is 1,4-butanediol. The chain extender, such as 1,4-butanediol, can be present in concentrations varying from 6% to 15%, but preferably ranges from 7% to approximately 13%.

Any suitable aliphatic organic diisocyanate, or mixture of diisocyanates, may be used in the elastomer forming process of the present invention. Representative examples of suitable organic diisocyanates include (TMXDI) meta-tetramethylxylene diisocyanate and paratetramethylxylene diisocyanate, isophorone diisocyanate (IPDI), dibenzyl diisocyanate, xylene diisocyanate (XDI), 3, 3'-bis toluene-4,4-diisocyanate, hexamethylene diisocyanate (HDI), hydrogenated MDI, hydrogenated XDI, cyclohexane diisocyanate, paraphenylene diisocyanate, mixtures and derivatives thereof and the like. The organic diisocyanates can be present in amounts ranging from 20% to 50% but are preferably present in amounts in the range of approximately 25% to 40%.

The ultraviolet stabilizing agents include a combination of a hindered amine light stabilizers (HALS) such as bis(1,2,2,6,6-pentamethyl-1-4-piperidinyl) sebacate (Chemical Abstract Number 41556-26-7, also known as Tinuvin 292 or 765 Ciba-Geigy Corp., Hawthorne, NY) and a hydroxyphenyl benzotriazole such as a benzotriazole mixture of poly (oxy-1,2-ethanediyl), alpha-[3-[3-(2H-benzotriazol-2-yl)-5-(1,1-dimethylethyl)-4-hydroxyphenyl]-1-oxopropyl]-omega-hydroxy- and poly(oxy-1,2-ethanediyl), alpha-[3-[3-(2H-benzotriazol-2-yl)-5-(1,1-dimethylethyl)-4-hydroxyphenyl]-1-oxopropyl)-omega-[3-[(2H-benzotriazol-2-yl)-5-(1,1,-dimethylethyl)-4-hydroxyphenyl]-1-oxopropoxy)-, Chemical Abstract Number 104810-47-1 and polyethylene glycol with a molecular weight of 300 Chemical Abstract Number 25322-68-3 (also known as Tinuvin 1130 or 213 Ciba-Geigy Corp., Hawthorne, N.Y.) and any other suitable ultraviolet stabilizing agents. The combination of ultraviolet stabilizing agents being present in a ratio in a range of approximately 1:1 to 2:1, with 2:1 being the preferred ratio, at a total concentration in the range of approximately 0.5 to 2.0%, with 2.0% being the preferred concentration.

Any suitable antioxidant, or mixture of antioxidants, may be used in the elastomer forming process of the present invention. Representative examples include Irganox 1010 [tetrakis (methylene(3,5-di-tert-butyl-4-hydroxycinnamate)] methane from Ciba-Geigy; Irganox 1076 [Octodecyl 3,5 di-tert-butyl-4-hydroxyhydrocinnamate] from Ciba-Geigy; Irganox 245 [Ethylenebis (oxyethylene) bis-(3-tert-butyl-4-hydroxy-5-methylhydrocinnamate)] from Ciba-Geigy; and Vanox 830 (a proprietary blend of a phenolic compound, alkylated diphenylamines and trialkyl phosphite from R. T.

Vanderbilt). The antioxidants may be present at a total concentration in a range of approximately 0.10% to 1.0%, but are preferably present in the range of approximately 0.25% to 0.75%. Applicants have found that the presence of antioxidants in this range provide enhanced resistance to heat aging as shown in Table 5.

Any suitable pigmenting agent or mixture of pigmenting agents may be used in the elastomer forming process of the present invention. The agent or agents must have long-term ultraviolet light resistance for Arizona exposure; heat resistance up to 260° C. (500° F.) to survive the dry casting process, and the extrusion compounding process; and must not promote any degradation of the urethane elastomer. Representative pigments include carbon black (Columbian Chemicals Corporation); titanium dioxide (DuPont Company, Chemicals Department); Chomophthal Red BPP (Ciba-Geigy, Pigments Division); Phthalocyanine Blue Red Shade (Ciba-Geigy, Pigments Divisions); Yellow Iron Oxide (Miles Incorporated, Organic Products Division); and Quinacridone Violet (Hoechst Celanese Corporation, Specialty Products Group-Pigments). The pigmenting agent being present at a total concentration in the range of approximately 0.90% to 2.0% and preferably in a range wherein the total concentration is approximately 1.0% to 1.94%.

The urethane catalysts which are useful in the present invention may be any suitable urethane catalyst, or mixture of urethane catalyst, may be used in the elastomer forming process of the present invention. Representative samples include (a) tertiary amines such as ZF-20 [bis 2-(N,N-dimethylamino)ether] from Huntsman Chemical; N-methylmorpholine from Huntsman Chemical; N-ethylmorpholine from Huntsman Chemical; DMEA N,N-dimethylethanolamine from Union Carbide; Dabco 1,4-diazbicyclo[2,2,2]octane from Air Products and the like; (b) salts of organic acids with a variety of metals such as alkali metals, alkaline earth metals, Al, Sn, Pb, Mn, Co., Ni, and Cu, including, for example, sodium acetate, potassium laurate, calcium hexanoate, stannous acetate, and stannous octoate, and the like; (c) organometallic derivatives of tetravalent tin, trivalent and pentavalent As, Sb, and Bi, and metal carbonyls of iron and cobalt. Useful organotin compounds include dialkyltin salts of carboxylic acids, e.g., dibutyltin diacetate, dibutyltin dilaurate, dibutyltin maleate, dilauryltin diacetate, dioctyltin diacetate and the like. Preferred catalysts are BiCat 8, BiCat 12, BiCat V and Coscat 83. The BiCat materials are products of Shepherd Chemical. Coscat 83 is a product of CasChem Corporation. BiCats 8 and 12 are mixtures of bismuth and zinc carboxylates with the general formula:

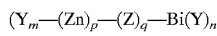

$(Y_m-(Zn)_p-(Z)_q-Bi(Y)_n$ where Y is the carboxylate functionality, Z is oxygen and m+n+2q=3+2p. BiCat V and Coscat 83 are bismuth neodecanoates. These catalysts are present at a total concentration in the range of approximately of 0.1% to 0.3% by weight, and preferably in the range of approximately 0.15% to 0.25%.

Automobile interior trim components having increased ultraviolet light stability and resistance to artificial weathering can be produced by continuous processing utilizing an extruder wherein the virgin elastomer is extruded and molded into automotive interior trim components as is well known in the art. In the alternative, the castable powder elastomer, described above, may be added to a mold and heated to produce an automotive trim component.

In accordance with another aspect of the invention, microspheres can be formed in the size range of 0.007" to 0.040" suitable for use in roto-casting. In such process a predetermined charge of materials is placed within a hollow mold that is supported on an arm of a centrifuge. The centrifuge has a motor that will drive the arm to cause the charge of material to flow evenly across the inner surface of the mold. The mold is heated to cause the thermoplastic microspheres to melt as they are flowed evenly across the inner surface to build-up a uniform thickness shell on the mold. The mold and shell are cooled and the mold is opened to remove the shell as a finished part or a near net shape part for final finishing. The process includes the steps of providing thermoplastic microspheres formed by melt extruding materials as set forth above. One suitable example included thermoplastic microspheres made according to NB REF 1000-108-1 as shown in Table 1. The amount of different constituents that are used to form the melt extruded thermoplastic microspheres of the present invention will depend upon the part that is to be manufactured by either roto-casting, slush molding or other known powder casting processes in which thermoplastic particles are melted on a heated surface to form a skin or shell thereon. The resultant particles have a diameter of from 0.007" to 0.040". The process includes placing a charge of such microspheres corresponding to the weight of the finished product in a closed hollow heated mold and centrifugally and melt flowing the material into a shape corresponding to the heated mold surface; thereafter cooling the centrifugally molded part and removing it from the closed hollow heated mold.

In accordance with another aspect of the invention the aforesaid microspheres formed in the size range of 0.007" to 0.040" are suitable for use in slush molding. In such process an excess charge of the materials is placed in a charge or powder box. The box is connected to a mold having a cavity formed in part by a casting surface heated or cooled by a suitable heater or air cooling system. Once the box is connected to the mold, the box and mold are inverted so that the excess charge of materials is dumped into the mold cavity. Typical slush molding apparatus is set forth in U.S. Pat. Nos. 4,722,678; 4,878,827 and 4,056,941 all owned by the assignee of the captioned application. The aforesaid United States Patents include maintaining a static head of material over the layer of material that is dumped onto the casting surface of the mold cavity. The heating system provides heated air (other suitable heaters are suitable for use with the invention such as the hot oil heater of U.S. Pat. No. 4,389,177 or electrical heaters as shown in U.S. Pat. No. 4,979,888). The casting surface is heated to cause the thermoplastic melt extruded microspheres to melt as they are flowed evenly across the casting surface and compacted thereon by the static head of the overlying material. It has been found that this enables a wider range of microsphere sizes to be used for build-up of a uniform thickness shell on the casting surface having low porosity that is below a visual threshold for holes in the skin. Visual threshold, for purposes of this application, is determined as follows:

A person with normal vision 20/20 at 20 feet with an acute angle of 5 minutes of arc (from the top of the letter to its bottom to the focal point meeting the eye) can discern a letter that is 8.7 mm high (0.342541 ). A person with 20/15 vision can discern a letter 6.52 mm (0.2566") and a person with super vision 20/10 can discern a letter at 20 feet that is 4.35 mm (0.1712") high.

A person with 20/13 vision looking at a fine grid pattern from a distance of 16 inches would have a maximum resolvable separation ability of 0.35 mm (0.01379"). While there wasn't a reference for a closer distance, we theorized that at 8 inches a person with extremely acute vision may be able to discern a hole of 0.0068" in diameter.

The present invention produces skins that have porosity less than this threshold usually with fewer pores and diameters less than 0.003".

The mold cavity is cooled by suitable air cooling or liquid cooling systems as shown in U.S. Pat. Nos. 4,621,994; 4,623,503 and 5,106,285, all owned by the assignee of the present application and incorporated by reference herein. The shell is concurrently cooled and the powder box and mold cavity are separated so that the mold is opened to remove the shell as a finished part or a near net shape part for final finishing. The process includes the steps of providing thermoplastic microspheres formed by melt extruding materials as set forth above.

Conventional mold release agents for thermoplastic urethane elastomers do not work for powder casting. The conventional materials work well when the elastomers are injection molded. Conventional mold release agents work for injection molding because of the higher melt viscosity of the elastomers and cooler tool temperatures that can be tolerated by the injection molding process. This allows the release agent to preferentially migrate to the colder tool surface. However, during powder casting, the tool surface is hot and the powder remains cold until it is placed on the surface of the tool. The tool surface temperature provides a low viscosity and a high degree of wetting to duplicate the grained surface while high injection pressures are used during the injection process. Moreover, the casting tool temperature is then reduced sufficiently to change the liquid phase to a solid for removal. There is little opportunity for conventional release agents to migrate to the surface to perform the internal release function. In the elastomers of the present invention, the release agents have been post-blended with the thermoplastic urethane (TPU) powder. These powders were mixed in a high-intensity mixer such as a Welex or Henchel to a temperature of about 200° F. to accomplish drying and dispersing of the agents. The use of FR 65 (Mold Wiz INT-FR65, Axel Plastics Research Laboratories, Inc., Woodside, N.Y.) a proprietary condensation product of synthetic resins, glycerides, and organic acid derivatives with copolymers of organic phosphate esters in an intimate combination with other wise modified fatty acids allowed the agents to wet out the particles. Mineral oil can also be used for this purpose but FR 65 appears to provide a drier powder.

Additionally, the elastomers of the present invention can be used to cast shells. Minibeads and spheroidal particles made by extruding aliphatic thermoplastic elastomer and pelletizing with a Gala underwater pelletizing system, have been successfully cast into shells using the same equipment as used for powder. The particle size distribution for the initial lots of minibeads is shown in Attachment 5. This distribution is substantially different from the vinyl or TPU powder. The low-melt viscosity of the present urethane compositions contributes greatly to the success in using this material to cast shells. The benefits seen from the beads are improved flow into areas with small radiuses and return edges, easier clean up and loading, and increased bulk density of the particle.

Finally, all these developments provide an opportunity to produce pigmented aliphatic thermoplastic urethane elastomer (TPU) using a single twin screw extruder. Twin crew extruders can be used to make thermoplastic urethane elastomers which are non-pigmented. These materials are then pigmented in a second operation by using color concentrates for injection molding or dry/wet pigments in a second extruder or other high-intensity mixers for other applications. Liquid monomers (polyols, chain extenders, antioxidants, UV absorbers, catalysts, isocyanates) can be introduced into the feed zone of the twin screw extruder using either loss in weight feeders, positive displacements pumps or a highly accurate urethane casting machine. The materials are allowed to react to form the urethane elastomer. After melting the elastomer, the dry (heat and UV stable automotive grade) pigments and other additives (antioxidants, release agents etc.) could be metered into the melt stream of the reactor to produce the desired color and then the melt could be fed to the pelletizing unit to produce pellets that can be further dried for use. This process reduces the handling operations currently used to pigment elastomers. The heat history that the materials would experience lowers cost and provides a more uniform product pellets for the casting process.

EXAMPLES

Table 1 illustrates the results of artificial weathering (Xenon arc) exposure on thermoplastic urethane elastomers constructed as described above. Samples of thermoplastic urethane elastomers were subjected to Xenon arc lamps and the amount of kilojoules of exposure was recorded. Table 1 illustrates that thermoplastic urethane elastomers produced according to the present invention were able to withstand greater than 2450 kilojoules of exposure with a DE$\leq$3.00 without cracking due to artificial weathering.

Table 2 illustrates the effect of low levels of two antioxidants, no ultraviolet absorbers, and low pigment level on the ability of thermoplastic urethane elastomers to resist artificial (Xenon arc) weathering. Table 2 illustrates the necessity for the presence of an ultraviolet absorber in order to achieve the artificial weathering requirements of greater than 2450 kilojoules of Xenon arc exposure with a DE$\leq$3.00 without cracking.

Table 3 illustrates the effect of a 1:1 ratio of hindered amine light stabilizing ultraviolet absorber to hydroxyphenyl benzotriazole ultraviolet absorber at a total ultraviolet absorber level of 0.50% and pigment levels greater than 2.0% on artificial (Xenon arc) weathering. As illustrated in Table 3, thermoplastic elastomers produced having these amounts of constituents failed to achieve the artificial weathering requirements of greater than 2450 kilojoules of Xenon arc exposure with a DE$\leq$3.00 without cracking.

Table 4 illustrates the criticality and effect of total ultraviolet absorber concentration at a 2:1 ratio of hindered amine light stabilizing (HALS) to hydroxyphenyl benzotriazole on artificial (Xenon arc) weathering. As shown in Table 4, the thermoplastic elastomer, compounded according to the present invention, referenced as NB REF 1000 (108-1) which had a 2:1 ratio of ultraviolet absorbers at a total concentration of nearly 2.0% yielded a thermoplastic elastomer which achieved the artificial weathering requirements of greater than 2450 kilojoules of Xenon arc exposure with a DE$\leq$3.00 without cracking whereas a similar thermoplastic elastomer, referenced as NB REF 1000 (110-1) which had a 2:1 ratio of ultra violet absorbers at a total concentration of approximately 1.0% yielded a thermoplastic elastomer which failed to achieve the artificial weathering requirements of greater than 2450 kilojoules of Xenon arc exposure with a DE$\leq$3.00 without cracking.

Table 5 illustrates the importance of increased antioxidant to meet heat aging requirements. As can be seen from Table 5, the presence of antioxidant clearly increased the heat resistance of the thermoplastic elastomers.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

TABLE 1

ACTUAL TPU FORMULATIONS USED FOR ARTIFICIAL WEATHERING (XENON ARC)

| INGREDIENT | NB REF 10000 108-1 | NB REF 1000 108-2 | NB REF 1000 108-3 |
|---|---|---|---|
| | "SOFT" | "MEDIUM" | "HARD" |
| L255-28 | 59.19 | 48.66 | 41.31 |
| 1, 4BDO | 7.81 | 10.70 | 12.71 |
| TINUVIN 292 OR 765 | 1.34 | 1.34 | 1.34 |
| TINUVING 1130 PR 213 | 0.66 | 0.66 | 0.66 |
| IRGANOX 1010 | 0.10 | 0.10 | 0.10 |
| BiCAT V | 0.20 | 0.20 | 0.20 |
| GRAY FP 75-45 | 4.42 | 4.42 | 4.42 |
| VPG 1732 | 0.10 | 0.10 | 0.10 |
| TOTAL | 73.82 | 66.08 | 60.84 |
| DES W | 26.18 | 33.12 | 39.16 |
| POLYOL/ISOCYANATE TOTAL | 100.00 | 100.00 | 100.00 |
| INDEX | 97.40 | 97.50 | 97.60 |
| | 1.94% PIGMENT | 1.94% PIGMENT | 1.94% PIGMENT |
| PTL REFERENCE | 21802.00 | 21939.00 | 21939.00 |
| DELTA E AFTER XENON | 0.30 | 0.96 | 0.35 |
| KILOJOULES OF EXPOSURE | 1454.00 | 1492.00 | 1492.00 |
| DELTA E AFTER XENON | 0.18 | 0.81 | 0.29 |
| KILOJOULES OF EXPOSURE | 1951.00 | 1931.00 | 1931.00 |
| DELTA E AFTER XENON | 1.43 | 0.33 | 1.08 |
| KILOJOULES OF EXPOSURE | 2460.00 | 2556.00 | 2556.00 |
| RESULTS | | CRACKED | |
| DELTA E AFTER XENON | 2.16 | 1.32 | 2.48 |
| KILOJOULES OF EXPOSURE | 3085.00 | 3056.00 | 3056.00 |
| DELTA E AFTER XENON | | 2.09 | 3.06 |
| KILOJOULES OF EXPOSURE | | 3508.00 | 3508.00 |
| COLD CRACK AS RECEIVED | 3/3, PASS | 3/3, PASS | 3/3, PASS |
| PTL REFERENCE | 21804.00 | 21938.00 | 21983.00 |
| COLD FLEX, -22 F. | 3/3, PASS | 3/3, PASS | 3/3, PASS |
| TENSILE, PSI | 926.00 | 1201.00 | 1066.00 |
| ELONGATION, % | 342.00 | 205.00 | 97.00 |
| TEAR, PPI | 228.00 | 295.00 | 243.00 |
| SPECIFIC GRAVITY | 1.08 | 1.06 | 1.08 |
| ATL REFERENCE | 21476.00 | 21476.00 | |
| GM FOG, 110 C. | 99.60 | 99.20 | |
| | BURN RATE = 0.65"/MIN PTL21801 | | |

TABLE 2

EFFECT OF LOW LEVELS OF TWO ANTIOXIDANTS, NO UV ABSORBERS AND LOW PIGMENT LEVEL ON ARTIFICIAL WEATHERING (XENON ARC)

| INGREDIENT | NB REF 1000 29-1 | NB REF 1000 29-2 | NB REF 1000 30-1 | NB REF 1000 30-2 | NB REF 1000 31-1 |
|---|---|---|---|---|---|
| L255-28 | 54.940 | 54.940 | 53.600 | 53.600 | 51.890 |
| L22G-56 | | | | | |
| 1,4BDO | 9.770 | 9.770 | 9.530 | 9.530 | 9.220 |
| TINUVIN 292 OR 765 | | | | | |
| TINUVIN 1130 OR 213 | | | | | |
| IRGANOX 1010 | | 0.100 | 0.100 | 0.100 | |
| IRGANOX 1076 | 0.100 | | 0.100 | | |

TABLE 2-continued

EFFECT OF LOW LEVELS OF TWO ANTIOXIDANTS, NO UV ABSORBERS AND LOW PIGMENT LEVEL ON ARTIFICIAL WEATHERING (XENON ARC)

| INGREDIENT | NB REF 1000 29-1 | NB REF 1000 29-2 | NB REF 1000 30-1 | NB REF 1000 30-2 | NB REF 1000 31-1 |
|---|---|---|---|---|---|
| COSCAT 83 | 0.400 | 0.400 | 0.400 | 0.400 | 0.400 |
| GRAY FP 75–45 | 2.210 | 2.210 | 4.560 | | |
| RED FP 73–550 | 4.560 | 4.560 | | | |
| LOXIOL G71s | 1.000 | 1.000 | 1.000 | 1.000 | 1.000 |
| TOTAL | 68.420 | 68.420 | 69.190 | 69.190 | 70.170 |
| DES W | 31.580 | 31.580 | 30.810 | 30.810 | 29.830 |
| INDEX | 98.000 | 98.000 | 98.000 | 98.000 | 98.000 |
|  | 1% PIGMENT | 1% PIGMENT | 1% PIGMENT | 1% PIGMENT | 2% PIGMENT |
| PTL REFERENCE | 21031.000 | 21030.000 | 21031.000 | 21031.000 | 21031.000 |
| DELTA E AFTER XENON |  |  |  |  |  |
| KILOJOULES OF EXPOSURE | 452.000 | 648.000 | 452.000 | 452.000 | 452.000 |
| RESULTS | FAILED CRACKING | FAILED CRACKING | FAILED CRACKING | FAILED CRACKING | FAILED CRACKING |
| COLD CRACK AS RECEIVED | 3/3, PASS |  | 3/3, PASS | 3/3, PASS | 3/3, PASS |
| PTL REFERENCE | 21032.000 | 21033.000 | 21032.000 | 21032.000 | 21032.000 |
| COLD FLEX, −22 F. | 3/3, PASS | 3/3, PASS | 3/3, PASS | 3/3, PASS | 3/3, PASS |
| TENSILE, PSI | 1111.000 | 1038.000 | 1048.000 | 8G6.000 | 754.000 |
| ELONGATION, % | 380.000 | 315.000 | 333.000 | 22G.000 | 163.000 |
| TEAR, PPI | 380.000 | 336.000 | 314.000 | 258.000 | 214.000 |
| SPECIFIC GRAVITY | 1.003 | 1.013 | 1.027 | 0.917 | 0.903 |
| ATL REFERENCE | 21032.000 | 21037.000 | 21038.000 | 21047.000 | 21046.000 |
| GM FOG, 110 C. | 95.900 | FAIL | FAIL | FAIL | FAIL |

TABLE 3

EFFECT OF 1:1 RATIO OF UV ABSORBERS AT A TOTAL UV ABSORBER LEVEL OF 0.50% AND HIGHER PIGMENT LEVELS ON ARTIFICIAL WEATHERING (XENON ARC)

| INGREDIENT | NB REF 1000 60-1 | NB REF 1000 61-1 |
|---|---|---|
| L255-28 | 56.12 | 55.250 |
| 1, 4BDO | 8.20 | 8.120 |
| TINUVIN 292 | 0.25 | 0.250 |
| TINUVIN 1130 | 0.25 | 0.250 |
| IRGANOX 1010 | 0.10 | 0.100 |
| COSCAT 83 | 0.20 | 0.200 |
| GRAY FP 75-45 | 4.30 | 8.520 |
| LOXIOL G705 | 0.10 | 0.100 |
| TOTAL | 75.52 | 72.780 |
| DES W | 27.48 | 27.220 |
| INDEX | 98.00 | 98.000 |
| PTL REF | 1402.00 | 1402.000 |
| DELTA E AFTER XENON |  |  |
| KILOJOULES OF EXPOSURE |  |  |
| RESULTS | FAILED CRACKED | FAILED CRACKED |
| COLD CRACK AS RECEIVED | 3/3, PASS | 3/3, PASS |
| PTL REF | 21384.00 | 21396.000 |
| COLD FLEX, −22 F. | 3/3, PASS | 3/3, PASS |
| TENSILE, PSI | 812.00 | 813.000 |
| ELONGATION, % | 193.00 | 230.000 |
| TEAR, PPI | 160.00 | 184.000 |
| SPECIFIC GRAVITY | 1.08 | 1.093 |
| ATL REFERENCE | 21273.00 | 21279.000 |
| GM FOG, 110 C. | 98.40 | 97.800 |

TABLE 4

EFFECT OF TOTAL UV ABSORBERS CONCENTRATION AT A 2:1 RATIO OF HALS/BENZOTRIAZOLE ON ARTIFICIAL WEATHERING (XENON ARC)

| INGREDIENT | NB REF 1000 110-1 | NB REF 1000 108-1 |
|---|---|---|
| L255-28 | 56.82 | 59.19 |
| 1, 4BDO | 7.90 | 7.81 |
| TINUVIN 292 OR 765 | 0.67 | 1.34 |
| TINUVIN 1130 OR 213 | 0.33 | 0.66 |
| BiCAT V | 0.20 | 0.20 |
| GRAY FP 75-45 | 4.42 | 4.42 |
| VPG 1732 | 0.10 | 0.10 |
| TOTAL | 73.54 | 73.82 |
| DES W | 26.46 | 26.18 |
| POLYOL/ISOCYANATE TOTAL INDEX | 100.00 97.30 | 100.00 97.40 |
| PTL REFERENCE | 22028.00 | 21802.00 |
| DELTA E AFTER XENON KILOJOULES OF EXPOSURE | 1.13 1391.00 | 0.30 1454.00 |
| DELTA E AFTER XENON KILOJOULES OF EXPOSURE RESULTS | 0.53 2016.00 | 0.18 1951.00 CRACKED |
| DELTA E AFTER XENON KILOJOULES OF EXPOSURE RESULTS | 1.49 2516.00 STOPPED | 1.43 2460.00 |
| DELTA E AFTER XENON KILOJOULES OF EXPOSURE |  | 2.16 3085.00 |
| COLD CRACK AS RECEIVED | 3/3, PASS | 3/3, PASS |
| PTL REFERENCE | 22027.00 | 21804.00 |
| COLD FLEX, −22 F. | 3/3, PASS | 3/3, PASS |
| TENSILE, PSI | 874.00 | 926.00 |
| ELONGATION, % | 218.00 | 342.00 |
| TEAR, PPI | 261.00 | 228.00 |
| SPECIFIC GRAVITY | 1.08 | 1.08 |
| ATL REFERENCE |  | 21476.00 |
| GM FOG, 110 C. |  | 99.60 BURN RATE = 0.65"/MIN PTL21801 |

TABLE 5

248° F. HOURS TO CRACK - "TPU"
IN: FEB. 9, 1994 @ 10:10 A.M.
OUT: HOURS TO CRACK
FOAM SYSTEMS: ¼" MILES 146 6–7PCF & DUC-146A 6–7PCF
ORIGINATOR: D. RUPPRECHT
UPDATED BY: V. CASTILLO
3/10/94
BOOK #1064-23
PROJECT #60010

|   | WHERE SKINS WERE MADE | | COLOR | | | HOURS TO CRACK SKIN ONLY | SKIN w/FOAM |
|---|---|---|---|---|---|---|---|
| 1. | 1068-21B CONTROL | ATC 12" × 12" | NEUTRAL/GRAPHITE | w/o ANTIOXIDANT | | 192 HRS | 192 HRS |
|   | SKIN FAILED WITH CRACKS @ 168 hrs/SKIN w/FOAM MILES 146,DUC 107A FAILED WITH CRACKS @ 192 hrs | | | | | | |
| 2. | 1068-21A | ATC 12" × 12" | NEUTRAL/GRAPHITE | w/ ANTIOXIDANT | | 492 HRS | 492 HRS |
|   | SKIN SLIGHT GLOSS SPOTS w/CRACKS WITHIN GLOSS SPOTS @ 492 hrs | | | | | | |
|   | SKIN w/FOAM MILES 146,DUC 107A SLIGHT GLOSS SPOTS w/CRACKS WITHIN GLOSS SPOTS @ 492 hrs | | | | | | |
| 3. | 1010-150-1 | ATC 12" × 12" | DK. GRAY #9780 | DL1013 | | NO CRACKS @ 492 HRS | |
|   | SKIN SLIGHT STIFFNESS NO CRACKS @ 492 hrs | | | | | | |
|   | SKIN w/FOAM MILES 146, DUC 107A MODERATE STIFFNESS NO CRACKS @ 492 hrs | | | | | | |
| 4. | 1010-150-2 | ATC 12" × 12" | DK. GRAY #9780 | DL 1011 | | NO CRACKS | |
|   | SKIN SLIGHT STIFFNESS NO CRACKS @ 492 hrs | | | | | | |
|   | SKIN w/FOAM SEVERE STAINING @ 444 hrs. SEVERE STAINING NO CRACKS @ 492 hrs | | | | | | |
| 5. | SPRAY URETHANE | FARMINGTON I.P. | DK. GRAY #9780 | | | NO CRACKS @ 492 HRS | |
|   | SKIN NO CRACKS @ 492 hrs | | | | | | |
|   | SKIN w/FOAM DUC 107A NO CRACKS @ 492 hrs | | | | | | |
| 6. | 1068-21B | ATC-PRAB DODGE LH | NEUTRAL/GRAPHITE | w/o ANTIOXIDANT | | 216 HRS | 240 HRS |
|   | SKIN CRACKS @ 216 hrs | | | | | | |
|   | SKIN w/FOAM DUC 107A CRACKS @ 240 hrs | | | | | | |
| 7. | 1068-21A | ATC-PRAB DODGE LH | NEUTRAL/GRAPHITE | w/ ANTIOXIDANT | | 468 HRS | 492 HRS |
|   | SKIN SEVERE GLOSS SPOTS w/CRACKS WITHIN GLOSS SPOTS @ 468 hrs | | | | | | |
|   | SKIN w/FOAM DUC 107A SLIGHT GLOSS SPOTS w/CRACKS WITHIN GLOSS SPOTS @ 492 HRS | | | | | | |
| 8. | 1068-21A | ATC-FARM OLDS CH | NEUTRAL/GRAPHITE | w/ ANTIOXiDANT | | 468 HRS | 492 HRS |
|   | SKIN SLIGHT GLOSS SPOTS w/CRACKS WITHIN GLOSS SPOTS @ 468 hrs, MODERATE GLOSS SPOTS w/CRACKS WITHIN GLOSS SPOTS @ 492 hrs | | | | | | |
|   | SKIN w/FOAM MILES 146,DUC 107A GOOD @ 492 hrs | | | | | | |
| 9. | 1068-21 | ATC-FARM OLDS CH | NEUTRAL/GRAPHITE | w/ ANTIOXiDANT | | — | GOOD |
|   | SKIN w/FOAM DUC 107A GOOD @ 492 hrs | | | | | | |
| 10. | 1058-68 BOB BOOTH* | ATC-PRAB DODGE LH | NEUTRAL/GRAPHITE | w/ANTIOXIDANT | | 444 HRS | — |
|   | SKIN SLIGHT GLOSS SPOTS w/CRACKS WITHIN GLOSS SPOTS @ 444 hrs | | | | | | |
|   | SKIN SEVER GLOSS SPOTS w/CRACKS WITHIN GLOSS SPOTS @ 468 hrs | | | | | | |

*1064-7-2 WITH IRGANOX 1010 @ 0.5% CHANGING BOOKS TO 1068-21 DON PRESTONS DODGE LH LP.'S UNDER BOOK #1058-68 AS ABOVE
*FUTURE WORK THIS TRIAL WILL BE RAN AGAIN WITH 0.75% ANTIOXIDANT ADDED TO TPU POWDER.
ALL FOAM FAILED @ 24 HRS

We claim:

1. An improved light stable polyether/polyol based aliphatic thermoplastic urethane elastomer, said elastomer comprising the product of:
   (a) a polyol;
   (b) a chain extender;
   (c) an organic diisocyanate;
   (d) a first hindered amine light stabilizer and a second benzotriazole ultraviolet stabilizing agent;
   (e) an antioxidant;
   (f) at least one pigment;
   (g) a urethane catalyst; and characterized by said first and second ultraviolet stabilizing agents being present in a ratio in a range of approximately 1:1 to 2:1 at a concentration in a range of approximately 0.25% to 2.0% of entire product composition, said antioxidant being present at a total concentration in a range of approximately 0.10% to 1.0% of entire product composition and said pigment being present at a total concentration in a range of approximately 1.0% to 2.0%, whereby said elastomer is light stable following exposure to a Xenon arc artificial weathering with a DE≦3.00 after 2450 kilojoules of output.

2. The elastomer of claim 1 wherein said ratio of ultraviolet stabilizing agents is 2:1.

3. The elastomer of claim 1 wherein the concentration of said ultraviolet stabilizing agents is 2.0%.

4. The elastomer of claim 1 wherein the concentration of said antioxidant is approximately 0.25% to 0.75%.

5. The elastomer of claim 1 wherein the concentration of said pigmenting agent is approximately 1.0% to 1.94%.

6. The elastomer of claim 1 wherein said polyol has end group unsaturation of less than 0.04 meq/g.

7. The elastomer of claim 1 wherein said chain extender is selected from the group consisting of 1,4-butanediol, ethylene glycol, diethylene glycol, propylene glycol, pentane diol, 3-methylpentane-1,5-diol, hexane diol, HQEE (hydroquinone bis(2-hydroxyethyl) ether), CHDM (1,4-cyclohexanedimethanol), and HBPA (hydrogenated bisphenol A).

8. The elastomer of claim 1 wherein said organic diisocyanate is selected from the group consisting of (TMXDI) meta-tetramethylxylene diisocyanate, paratetramethylxylene diisocyanate, isophorone diisocyanate (IPDI), dibenzyl diisocyanate, xylene diisocyanate (XDI), 3, 3'-bis toluene-4,4-diisocyanate, hexamethylene diisocyanate (HDI), hydrogenated MDI, hydrogenated XDI, cyclohexane diisocyanate, paraphenylene diisocyanate, mixtures and derivatives thereof.

9. The elastomer of claim 1 wherein said hindered amine light stabilizer is bis(1,2,2,6,6-pentamethyl-1-4-piperidinyl) sebacate.

10. The elastomer of claim 1 wherein said second ultraviolet stabilizing agent is a hydroxyphenyl benzotriazole.

11. The elastomer of claim 10 wherein said ydroxyphenyl benzotriazole is a benzotriazole mixture of poly(oxy-1,2-ethanediyl), alpha-(3-(3-(2H-benzotriazol-2-yl)-5-(1,1-dimethylethyl)-4-hydroxyphenyl)-1-oxopropyl)-omega-hydroxy- and poly(oxy-1,2-ethanediyl), alpha-(3-(3-(2H-benzotriazol-2-yl)-5-(1,1-dimethylethyl)-4-hydroxyphenyl) -1-oxopropyl)-omega-(3-((2H-benzotriazol-2-yl)-5-(1,1,-dimethylethyl)-4-hydroxyphenyl)-1-oxopropoxy)-, Chemical Asbstract Number 104810-47-1 and polyethylene glycol with a molecular weight of 300 Chemical Abstract Number 25322-68-3.

12. The elastomer of claim 1 wherein said pigment is selected from the group consisting of carbon black, titanium dioxide, Chomophthal Red BPP, Phthalocyanine Blue Red Shade, Yellow Iron Oxide, and Quinacridone Violet.

13. The elastomer of claim 1 wherein said antioxidant is selected from the group consisting of (tetrakis (methylene (3,5-di-tert-butyl-4-hydroxycinnamate)) methane, (Octodecyl 3,5 di-tert-butyl-4-hydroxyhydrocinnamate), (Ethylenebis (oxyethylene) bis-(3-tert-butyl-4-hydroxy-5-methylhydrocinnamate)), and Vanox 830 (from R. T. Vanderbilt) a blend of phenolic compound, alkylated diphenylamines and trialkyl phosphite.

14. A light stable automotive trim component, said component comprising the product of:

(a) a polyol;

(b) a chain extender;

(c) an organic diisocyanate;

(d) a first hindered amine light stabilizer and a second benzotriazole ultraviolet stabilizing agent;

(e) an antioxidant;

(f) at least one pigment;

(g) a urethane catalyst; and characterized by said first and second ultraviolet stabilizing agents being present in a ratio in a range of approximately 1:1 to 2:1 at a concentration in a range of aproximately 0.25% to 2.0% of entire product composition, said antioxidant being present at a total concentration in a range of approximately 0.10% to 1.0% of entire product composition, and said pigment being present at a total concentration in a range of approximately 1.0% to 2.0% of entire product composition, whereby said elastomer is light stable following exposure to Xenon arc artificial weathering with a DE≦3.00 after 2450 kilojoules of output.

15. The automotive trim component of claim 14 wherein said ratio of ultraviolet stabilizing agents is 2:1.

16. The automotive trim component of claim 14 wherein the concentration of said ultra violet stabilizing agents is 2.0%.

17. The automotive trim component of claim 14 wherein the concentration of said antioxidant is approximately 0.25% to 0.75% of entire product composition.

18. The automotive trim component of claim 14 wherein the concentration of said pigmenting agent is approximately 1.0% to 1.94% of entire product composition.

19. The automotive trim component of claim 14 said chain extender is selected from the group consisting of 1,4-butanediol, ethylene glycol, diethylene glycol, propylene glycol, pentane diol, 3-methylpentane-1,5-diol, hexane diol, HQEE (hydroquinone bis(2-hydroxyethyl) ether), CHDM (1,4-cyclohexanedimethanol), or HBPA (hydrogenated bisphenol A).

20. The automotive trim component of claim 14 wherein said organic diisocyanate is selected from the group consisting of (TMXDI) meta-tetramethylxylene diisocyanate, paratetramethylxylene diisocyanate, isophorone diisocyanate (IPDI), dibenzyl diisocyanate, xylene diisocyanate (XDI), 3, 3'-bis toluene-4,4-diisocyanate, hexamethylene diisocyanate (HDI), hydrogenated MDI, hydrogenated XDI, cyclohexane diisocyanate, paraphenylene diisocyanate, mixtures and derivatives thereof.

21. The automotive trim component of claim 14 wherein said hindered amine light stabilizer is bis(1,2,2,6,6-pentamethyl-1-4-piperidinyl) sebacate.

22. The automotive trim component of claim 14 wherein said at least one ultraviolet stabilizing agent is a hydroxyphenyl benzotriazole.

23. The automotive trim component of claim 22 wherein said hydroxyphenyl benzotriazole is a benzotriazole mixture of poly(oxy-1,2-ethanediyl), alpha-(3-(3-(2H-benzotriazol-2-yl)-5-(1,1-dimethylethyl)-4-hydroxyphenyl)-1-oxopropyl)-omega-hydroxy- and poly(oxy-1,2-ethanediyl), alpha-(3-(3-(2H-benzotriazol-2-yl)-5-(1,1-dimethylethyl)-4-hydroxyphenyl)-1-oxopropyl)-omega-(3-((2H-benzotriazol-2-yl)-5-(1,1,-dimethylethyl)-4-hydroxyphenyl) -1-oxopropoxy)-, Chemical Asbstract Number 104810-47-1 and polyethylene glycol with a molecular weight of 300 Chemical Abstract Number 25322-68-3.

24. The automotive trim component of claim 14 wherein said pigment is selected from the group consisting of carbon black, titanium dioxide, Chomophthal Red BPP, Phthalocyanine Blue Red Shade, Yellow Iron Oxide, and Quinacridone Violet.

25. The automotive trim component of claim 14, wherein said polyol has end group unsaturation less than 0.04 meq/g.

26. The automotive trim component of claim 14 wherein said antioxidant is selected from the group consisting of (tetrakis (methylene(3,5-di-tert-butyl-4-hydroxycinnamate)) methane, (Octodecyl 3,5 di-tert-butyl-4-hydroxyhydrocinnamate), (Ethylenebis (oxyethylene) bis-(3-tert-butyl-4-hydroxy-5-methylhydrocinnamate)), and Vanox 830 (from R. T. Vanderbilt) a blend of phenolic compound, alkylated diphenylamines and trialkyl phosphite.

* * * * *